June 21, 1960
A. ROSENFELD ET AL
2,941,311
OPTICAL RADAR SIMULATOR
Filed Feb. 26, 1958
3 Sheets-Sheet 1
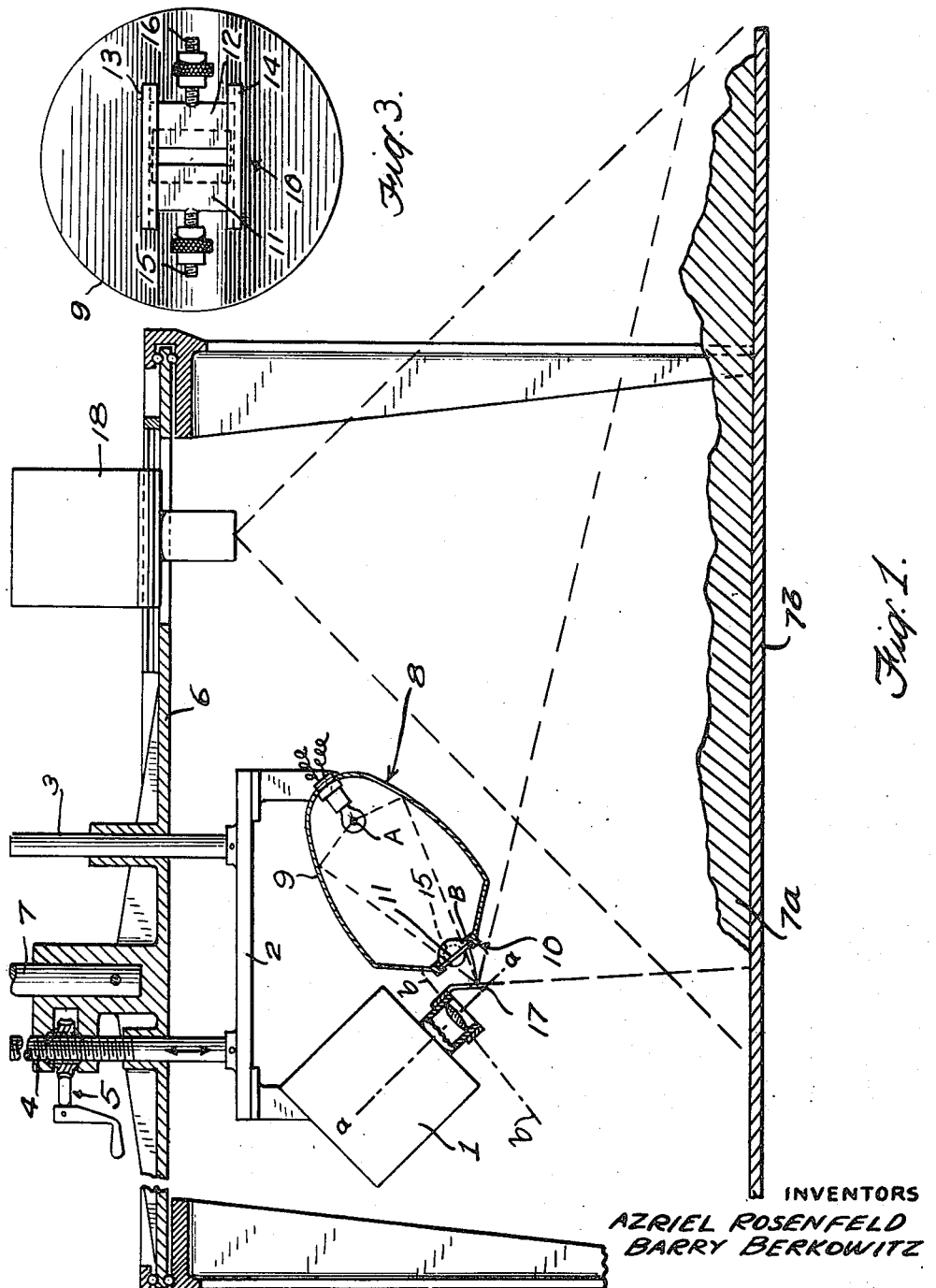
INVENTORS
AZRIEL ROSENFELD
BARRY BERKOWITZ
BY
Victor D. Borst
ATTORNEY

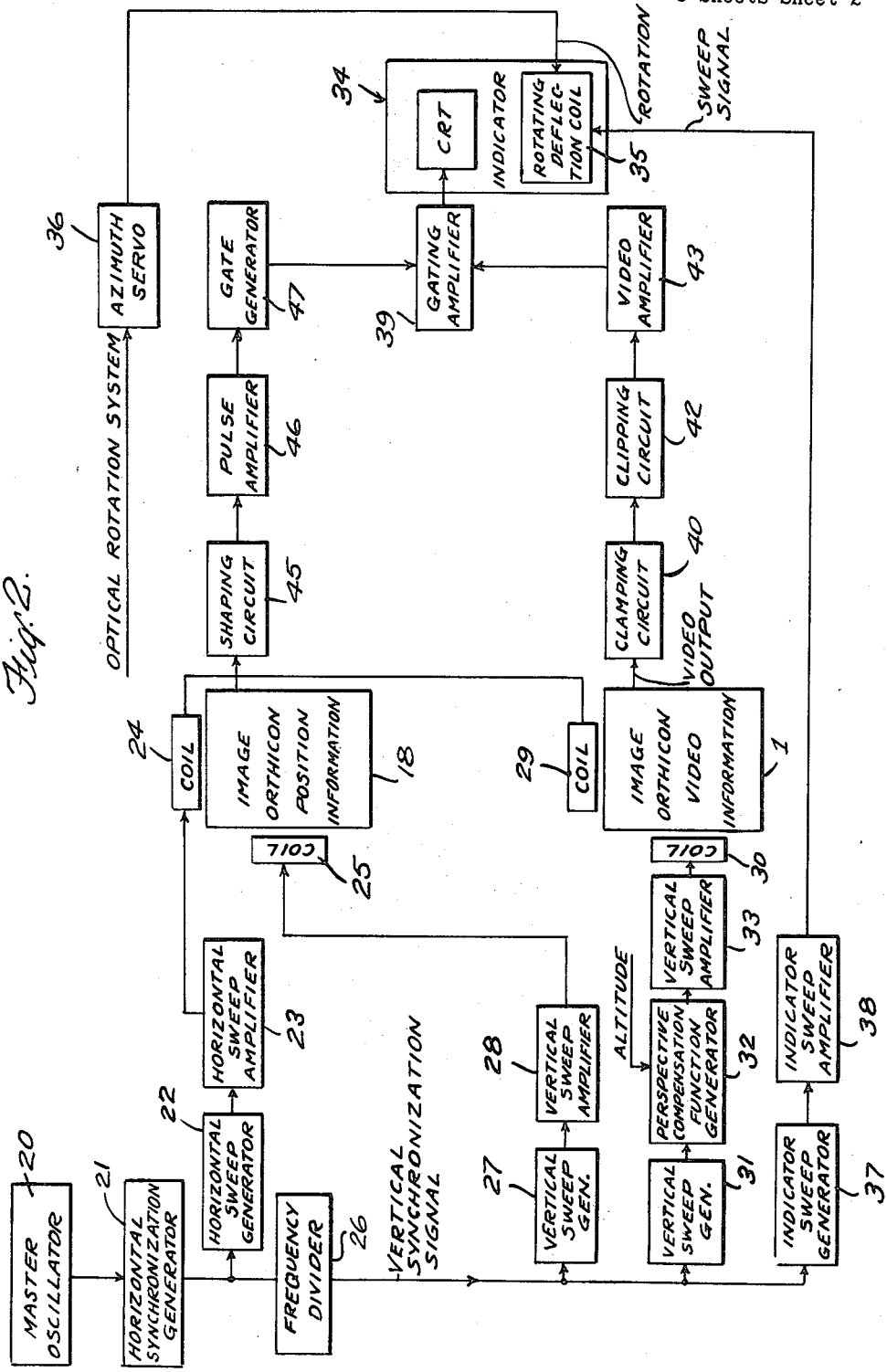

United States Patent Office 2,941,311
Patented June 21, 1960

2,941,311
OPTICAL RADAR SIMULATOR

Azriel Rosenfeld, New York, and Barry Berkowitz, Brooklyn, N.Y., assignors to Sperry Rand Corporation, Ford Instrument Company Division, Long Island City, N.Y., a corporation of Delaware Filed Feb. 26, 1958, Ser. No. 717,785

5 Claims. (Cl. 35—10.4)

This invention relates to optical radar simulator systems which employ a light source located at a point corresponding to the location of a radar antenna to illuminate a model of a given terrain and a cathode ray tube display unit to receive the energy which is derived from the detected light which is reflected from the model.

In radar simulators of the optical type, problems have most generally arisen in connection with establishment of means for illuminating the scale model and the means for detecting the light reflecting therefrom. In regard to the latter problem, it must be understood that the presentation on a radar scope is formed by the detection of energy which the terrain reflects in a reflex fashion. The pattern is generally quite different from those which result from specularly or diffusely reflected energy. Hence radar patterns can be best simulated by locating the optical detector effectively at the light source. On the other hand, a receiver at the same point as the source will be unable to detect the shadows formed by the source, since these are by definition out of the line of sight from the position of the source. A second possibility provides that the receiver be located high above the illuminated model area so that it can detect the shadows cast by the source. The disadvantage of this location for the receiver is that the reflection pattern which it detects is diffused and not that which results from reflex reflections.

As for the problem of illumination, one apparent solution might suggest overall illumination of the model. However, this requires that the detector located at the light source have an impossibly large field of view. Another solution might involve illuminating by scanning successive units of the area with a pencil beam of light. This latter method raises the difficult technical problems of optically simulating the radial resolution of radar and detecting the shadows formed by the very rapid light scan.

The subject invention generally contemplates the synchronized scanning by two image forming detectors, such as television cameras, of a single radius of the model terrain at a time. The cameras are caused to move in azimuth together with the radius of light. One of the cameras is located at the source and the other high above the model for detecting shadows by gating out the video signal of the first camera for those unit areas on the terrain where the shadows are formed. The camera which is located at the light source position serves to provide the basic display information according to the intensity of the detected light from each unit area of the model along the illuminated radius.

The invention will be better understood on reading the following detailed description of a preferred embodiment thereof which is taken in conjunction with the accompanying drawings, in which:

Fig. 1 is a schematic of the optical radar simulator system,

Fig. 2 is a block diagram illustrating the television camera and cathode ray tube display arrangement, Fig. 3 shows the light mask combination of the television optical system required to illuminate successive radii of the model terrain.

Figure 4:
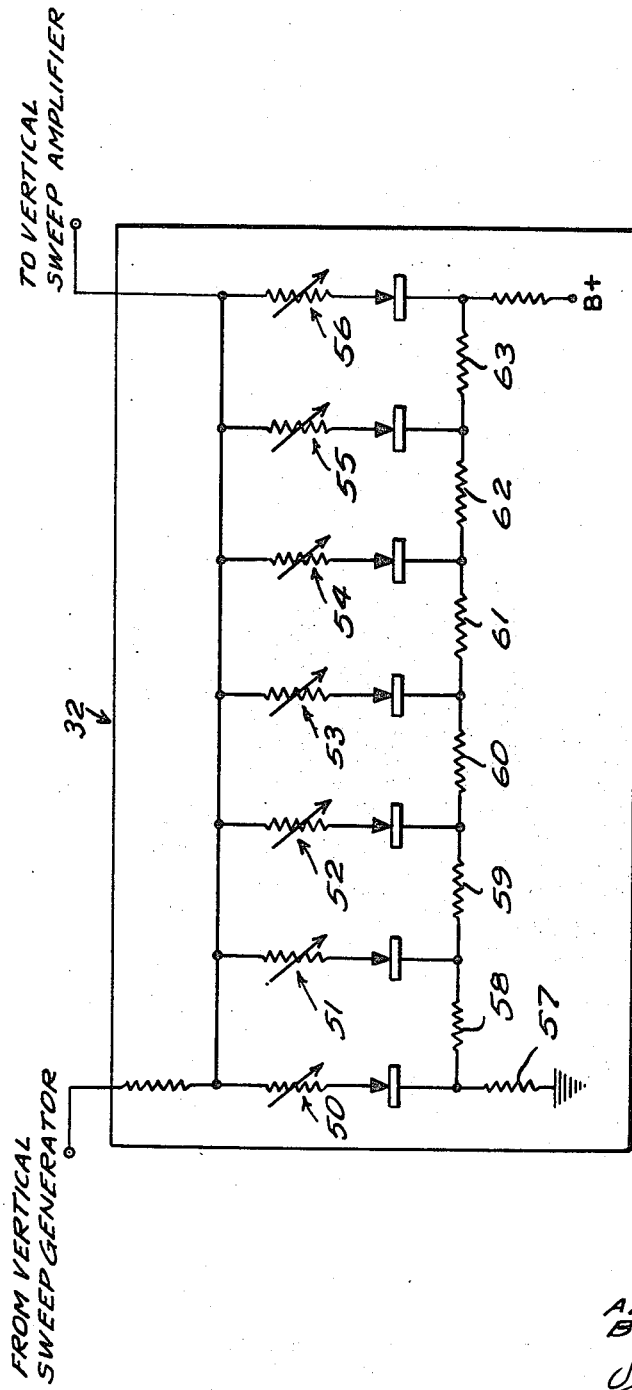
Fig. 4 shows the electronic circuit required for a perspective compensation function generator.

Referring to Fig. 1, a television camera 1 is suspended from a platform 2 which is vertically positioned on guide shaft 3 by means of shaft 4 threaded at its top end for engagement with worm drive unit 5. The two shafts are journaled in bore members integrally attached to azimuth turntable 6. An azimuth input shaft 7 is mounted in a hub bracket secured to the diametrical center of the turntable 6, the bracket being provided with a pair of apertured arms to receive the threaded end of the shaft 4 and worm drive unit 5. The camera 1 is normally situated close to the model terrain 7a supported below on a table 7b but may be raised and lowered by the drive unit 5 to provide different altitudes of simulated flight. In order to provide a wedge of light along the entire radius of the model from a source which is situated effectively at the position of the camera lens, a point source of light 8 is placed at one focus A of a truncated ellipsoidal mirror 9 also suspended as by a bracket from the platform 2. Secured to the truncated end of the mirror 9 near the focal point B is a mask 10 which shapes the light beam convergent on the point B by means of a vertical slit aperture provided therein. As shown in Fig. 3, the width of the aperture is adjustable by virtue of the positioning of twin shutters 11 and 12 in grooved tracks 13 and 14 by means of a fixed thumb screw engagement with threaded shanks 15 and 16, respectively, attached to the outer edges of the shutters. The narrow aperture in the mask 10 allows the passage of a fan beam of light which illuminates the model terrain 7 along the entire radius thereof.

A small plane mirror 17 is placed at the second focus B and serves as the apparent source of illumination. The mirror 17 is supported by a bracket attached to the camera lens housing in front of the camera lens so that it is out of the long range lens focus and will block a minimum of the light falling thereon.

Both the mirror 17 and the camera are tilted 45° or so to the vertical so that an entire radius of the model terrain can be illuminated and seen by the wide angle lens of the camera. An important consequence of this tilting is that the television image of the model terrain is perspective-distorted. This is due to the fact that, to form a clear image of the entire model radius, the camera lens must be tilted itself relative to the television photomosaic and is so indicated by the center line $a$—$a$ of the camera and the long axis $b$—$b$ in the plane of the lens which are shown to be nonperpendicular. The means for correcting the perspective distortion is described below.

A second television camera 18 is supported on the turntable 6 and is moved in azimuth over the model terrain thereby. The camera 18 serves to detect shadows along each successively scanned light radius on the model and as will be explained causes the intensity of the video signal of television camera 1 to be controlled so as to effect a true radar simulated pattern on the display tube.

Referring to Fig. 2, a master oscillator 20 is provided to furnish the sinusoidal reference frequency to horizontal synchronization generator 21. The synchronization generator 21 feeds a signal to horizontal sweep generator 22 which produces sawtooth voltages for amplifier 23 and the horizontal coil 24 of the television camera 18 which is preferably of the image orthicon type. The generator 21 is also connected to the vertical coil 25 of the camera 18 through a frequency divider 26, vertical sweep generator 27 and vertical sweep amplifier 28.

The horizontal coil 29 of the television camera 1 is synchronized with the horizontal coil 24 of the camera 18 by virtue of its series connection therewith. The vertical coil 30 of the camera 1 is supplied a vertical sweep signal by the divider 26, the output of which is fed to vertical sweep generator 31, perspective compensation function generator 32, and vertical sweep amplifier 33 which amplifies the generated sawtooth voltages.

A cathode ray tube 34 of the P.P.I. scanning type is provided to show the simulated radar pattern. The tube 34 has a rotating deflection coil 35 which is mechanically rotated by azimuth servo 36 energized according to the optical rotation system by means not shown. The radial sweep of the deflection coil 35 is controlled by a sweep signal provided by divider 26 the output of which is similarly connected into indicator sweep generator 37 and indicator sweep amplifier 38. Accordingly, the sweep signal provided the deflection coil of the indicator is synchronous with the vertical sweep signal supplied to the vertical coil 25 of the camera 18. Because of the presence of the perspective compensation function generator 32 in the circuit of the vertical coil 30 of the camera 1, the indicator sweep signal is not synchronous with the sweep signal provided to that coil. This is necessary to maintain the position synchronism of camera 1 and camera 18. That is, the projection on the camera mosaic of any given point on the model terrain is scanned simultaneously by camera 1 and camera 18 and presented in its correct position on the cathode ray tube 34.

Intensity information is supplied to the cathode ray tube as a signal by the video information camera 1 being modulated by the video output of the position information camera 18 so that the radial scan on the indicator will present shadow information. The modulation or control of the basic video output of the camera 1 is provided by a gating amplifier 39 which is directly connected to the cathode ray tube of the indicator 34. Accordingly, the camera 1 is connected to the gating amplifier 39 through clamping circuit 40, which stabilizes the voltage output of the camera, clipping circuit 42 and video amplifier 43, which supplies one of the coincident pulses to the gating amplifier 9. The second synchronized, coincident pulse is supplied to the gating amplifier 39 by the camera 18 through shaping circuit 45, pulse amplifier 46 and gate generator 47. The operation of the gating amplifier 39 is conventional serving to yield an output solely on the coincidence of the two video pulses. When the unit area of model terrain happens to be in shadow, no pulse is supplied by the camera 18 and consequently no signal is sent to the cathode ray tube indicator 34. For any given horizontal scan of the cameras, a point on the radial scan of the tube is intensity-controlled by the gating amplifier, terrain and shadow information along each illuminated radius on the model terrain being determined thereby.

The perspective compensation function generator 32 as shown in Fig. 4 is a function generator whose input is the linear sweep voltage from the vertical sweep generator 31, and whose output is the non-linear monotonically increasing function $$y = \frac{At}{Bt+C}$$

where A, B, and C are constant at a particular altitude. The function is approximated by a series of straight line segments generated by the diode-resistor branches 50, 51, 52, 53, 54, 55 and 56, respectively. The slope of the linear input voltage is changed, the same number of times as there are diode-resistors in the chain, as each diode fires at the voltage level set by the dropping resistors 57, 58, 59, 60, 61, 62 and 63, respectively. The resulting output matches the above function. The degree of match is determined by the number of diode-resistor branches. When the altitude is varied, the constants A, B and C change, and hence the values of the resistors in the diode-resistor branches 50, 51, 52, 53, 54, 55 and 56, respectively, must be adjusted accordingly.

The illuminated model wedge will be imaged vertically (that is, perpendicular to the raster lines on the camera photomosaics). Since the width of the illuminated wedge as determined by the mask 10 simulates the azimuthal resolution of the radar, the entire signal present on any given camera raster line will be displayed at a single point of the indicator cathode ray tube 34. Radial radar resolution can be approximated by additively combining signals from two or more raster lines at the nearer ranges. With the sweeps properly synchronized, the scanning of the model by the two cameras can be made synchronous so that unit areas of the model terrain are simultaneously sensed by simply physically aligning the cameras by the aid of a test chart and monitor. The synchronism with respect to the imaging and shadowing effects on the indicator is maintained by the rigid coupling of the light source with the two cameras, which are caused to rotate about the vertical axis of the shaft 7 through the model antenna location at the normal radar antenna rotation rate. Thus, in the course of a full rotation an entire circle of a model terrain will have been scanned in P.P.I. fashion by the system and displayed on the indicator. The variable control of the height of the platform 2 which supports the camera and its associated optical system makes possible a realistic exercise in radar training for flights over known terrain at low, medium and high levels.

Various modifications may be effected through the preferred embodiment described of the radar simulator without departing from the principle in scope of the invention as defined in the appended claims.

What is claimed is:

1. An optical radar simulator system comprising a turntable, means for supporting said turntable, a light source dependent from said turntable and adapted to cast a fan beam of light below said turntable, a television camera dependent from said turntable at substantially the same location as said light source, a second television camera dependent from said turntable and located a substantial distance from said light source, a cathode ray tube adapted for P.P.I. scanning and having a rotating deflection coil, each of said television cameras having a horizontal and vertical beam deflecting coil, means for furnishing a sweep signal to said horizontal beam deflecting coils, means for furnishing a sweep signal for the vertical beam deflecting coils of the cameras and the rotating deflection coils of said tube, means for intensity controlling said tube in accordance with the video output of one of the cameras, and means for modulating the video output of the said one of the cameras in accordance with the video output of the other of said cameras.

2. An optical radar simulator system as claimed in claim 1 wherein means are provided for varying the height of said first-mentioned television camera.

3. An optical radar simulator system as claimed in claim 1 wherein the means for furnishing a sweep signal to the vertical beam deflecting coil of the first-mentioned television camera includes a perspective compensation function generator.

4. An optical radar simulator system as claimed in claim 3 wherein said intensity controlling means includes a coincidence pulse gating amplifier and a video output circuit is connected between said first-mentioned television camera and said gating amplifier and a second video output circuit is connected between the second-mentioned television camera and said gating amplifier.

5. An optical radar simulator system as claimed in claim 4 wherein said first video output circuit includes a crimping circuit, a clipping circuit, and an amplifier and said second video output circuit includes a shaping circuit, a pulse amplifier and a gate generator.

References Cited in the file of this patent

UNITED STATES PATENTS 2,838,848   Bergstad et al. _____ June 17, 1958